May 17, 1966 R. M. LERNER 3,252,093

IMPULSE NOISE SUPPRESSION COMMUNICATION SYSTEM UTILIZING MATCHED FILTERS AND NOISE CLIPPING

Filed Oct. 9, 1961

INVENTOR.
ROBERT M. LERNER
BY Edward D. Thomas
AGENT

United States Patent Office 3,252,093

Patented May 17, 1966

3,252,093

IMPULSE NOISE SUPPRESSION COMMUNICATION SYSTEM UTILIZING MATCHED FILTERS AND NOISE CLIPPING

Robert M. Lerner, Shrewsbury, Mass., assignor, by mesne assignments, to Massachusetts Institute of Technology, a corporation of Massachusetts Filed Oct. 9, 1961, Ser. No. 143,963
8 Claims. (Cl. 325—42)

The present invention relates to the transmission of data over noisy channels and more particularly to the production of signal waveforms to minimize the interference with data communications produced by impulse noise.

Communication in the presence of noise is a problem which has been given much attention in the development of communication theory over the past decade. The optimum procedures for detecting signals in the presence of additive noise are well understood, provided the additive noise possesses the characteristics of white Gaussian noise, which has been extensively studied. The essential characteristics of a Gaussian noise process are that it exhibits no particular preferred waveform and that it tends to deliver energy at a uniform rate. However, the noise processes encountered at radio frequencies below the region of 150 mc. and including wire line communications are generally impulsive in the nature, i.e., have high amplitude for a short duration, and frequently originate from lightning, ignition, contacts, gas discharges or switching transients, for example. Accordingly, impulse noise waveforms tend to resemble the transient response of simple physical systems and are delivered as bursts of energy rather than smoothly in time. As a consequence, the conclusions reached on the basis of experience with, or analysis of, Gaussian noise fail to set forth the procedures appropriate to combating impulse noise in a communication channel.

A dearth of statistical data exists concerning the detailed characteristics of impulsive noise distribution or the tendency of impulse noise to occur in "bursts" of many distinct pulses, so that a rigorous analytical treatment is not possible. It is the major object of the present invention to set forth procedures for combating impulse noise in a communication system.

First, it is assumed that the communication channel has a restricted available system bandwidth and that the impulse noise of the channel may be represented by a succession of more or less widely spaced transients whose duration $T_p$ is of the order of magnitude of the reciprocal of the system bandwidth. Second, it is assumed that a linear filter is available whose impulse response has a very large duration-bandwidth product, the filter bandwidth W being about the same as that of the channel and the impulse response lasting for a long time $T_F$. As a noise impulse passes through such a filter, the energy which was delivered in time $T_p$ is now smeared out over the longer time $T_F$ and the output of the filter is a waveform occupying a bandwidth W. The amplitude of this noise has been reduced by a factor of:

$$\frac{A_{out}}{A_{in}}=\sqrt{T_p/T_F}$$

provided the filter has an average unity transmission in the pass band. Impulse noise smoothing may be continued to a point where the time of smearing $T_F$ equals the average time interval between noise pulses, at which point the reduction of impulse noise by smoothing can go little further since the smearing functions due to at least two noise impulses now add up.

As the length of the smearing out is increased to extend over time intervals long compared with the time between noise impulses, the average rate of noise energy flow approaches the long time average power and the regions of overlap of two or more pulses extend to cover the entire time axis. For some initial distributions of the impulse noise such very long smearing time intervals are desirable because of the tendency of the noise impulses to come in bursts of several impulses. When the duration of smearing is made very long compared with the interval between the largest noise impulses, many separate constituents of approximately equal size will add up to produce the resultant waveform and consequently the limiting form of the filtered noise distribution possesses Gaussian characteristic as $T_F$ becomes indefinitely large. It is not possible to eliminate the effects of impulse noise disturbance completely; the smearing filter technique does not destroy the noise energy. The filter response to impulse noise serves to spread out the noise energy over a considerable period of time and the effect is, therefore, essentially an integration in time.

So far only the distribution of impulse noise has been considered. Once the decision is made to smear the noise impulse out over a given time interval, it must be done in such a way that the data signal itself is not degraded beyond recognition. Consequently, a signal waveform must be selected which is appropriate for signalling through the smearing filter. The data itself is usually presented for transmission as a coded sequence of pulses, or, more generally, a coded sequence of elementary signals which are related to the data by amplitude, phase, or frequency shift keying modulation or by some similar simple modulation process. As used herein, the term elementary signal refers to a pulse-like waveform or a sinusoidal waveform with a pulse-like enevelope or any one of the successive states of a frequency shift keyed, pulse phase modulated, pulse amplitude modulated or pulse code modulation transmission (whether double-, single-, or vestigial-sideband), or a transmission similar to these. To convert such data into a set of signals suitable for signalling through the noise smearing filter at the receiver, we can employ at the transmitter a linear filter which is (in the signal passband) approximately the inverse filter to that used for smearing in the receiver. This pre-smearing filter operates on the essentially non-overlapping sequence of elementary signals to convert them into a sequence of signals overlapping in time; the effect of the linear "smearing" filter in the receiver is then to restore the original elementary signals while smearing out the noise impulses introduced between transmitter and receiver.

At least three techniques are available for designing filters having suitable smearing characteristics. They are: (a) the matched filter designed around all-pass or band-pass sections in the frequency domain; (b) the matched filter designed on the basis of a tapped delay line in the time domain; (c) the use of mismatched filters with pseudo-random transient responses. For a detailed discussion of the matched filter, reference may be made to the I.R.E. Trans. Inf. Theory IT–6, June 1960. These three classes of suitable filters are also discussed in "Lectures on Communication System Theory," E. J. Baghdady, editor, McGraw-Hill, ch. 11 (1961).

Other objects of the invention will be in part obvious and in part pointed out as the description proceeds.

In the drawings:

FIGURE 1 is a block diagram of the pulse data communication system.

FIGURES 2*a* and 2*b* show graphs of the characteristics of filters suitable for use in the system of FIGURE 1.

Figure 1:
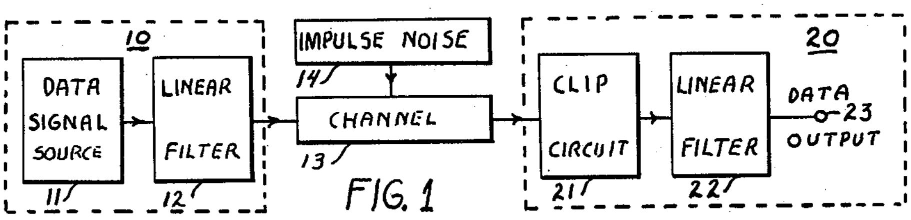

Referring to FIGURE 1, the block diagram of the system shows a transmitter 10 including a data signal source 11 which delivers to the system a coded sequence of elementary signals such as pulses, for example, representing data in binary form. The input pulses from source 11 are applied to pre-smearing filter 12 having an impulse response lasting for a time $T_F$. The output of filter 12 is fed to the communication channel 13, which may take the form of a noisy telephone line which is disturbed by additive impulse noise from source 14. The receiver, generally indicated as 20, is fed the noisy signals from the communication channel 13.

Since in some instances the impulse noise may have very high amplitude and "bursts" of noise may continue, it is possible that the receiver smearing process may not reduce the noise amplitude level below the signal level. For this reason the noise plus signal from channel 13 is first fed to clip circuit 21 of receiver 20. Clipper 21 may be any one of the well known peak clipping or voltage limiting circuits, such as the simple biased shunt diode. A clip level is established just above the usual maximum expected amplitude of the signal waveform so that the peaks of the noise are removed. With the peak noise level reduced by clipper 21 to the expected signal level, subsequent smearing acts to reduce the probability that noise can exceed the signal level. The function of the clip circuit 21 is twofold to recognize the presence of impulse noise and to counteract its effect in signal reception. The recognition is possible because the signal is such as to deliver energy to the receiver at a substantially constant rate and thus, when clipping occurs, impulse noise is present.

The output of clip circuit 21 is applied to the input of filter 22. The function of filter 22 is to collect the smeared-out signal fed to channel 13 by filter 12 and to deliver a pulse or elementary signal to output terminal 23 while simultaneously smearing the additive noise. In order to function in this manner filter 22 must have a transient response lasting for at least time $T_F$, consequently the output pulse in response to the signal from channel 13 is in general accompanied by a "side-lobe" or "hash level" response that lasts for a length of time at least equal to $2T_F$. This "hash level" response is a source of potential intersymbol interference in the output data.

A waveform-reversal system illustrates one way of transmitting a sequency of binary digits. The succession of waveforms which represent the message are delivered to the transmitter 10 as a series of pulses which are positive or negative according as the binary digits are ones or zeros. Assuming that the signal digits occur at the rate of 2500 per second, the time interval between data pulses is $T=0.4$ millisecond. Let the train of data pulses have sufficient bandwidth W so that the individual pulse waveforms do not overlap in time. Filter 12 can be designed to have the characteristic shown in FIGURE 2*a* in which the amplitude response is flat over the bandwidth W of the signal but in which the phase response contains so much delay distortion that each individual signal pulse is smeared out over 10 milliseconds of time $T_F$ in the output.

The signal which is delivered to channel 13 by filter 12 will contain at any one time the superposition of waveforms due to 25 successive signal digits since the delay time of 10 milliseconds lasts 25 times as long as the time interval between successive signal digits.

Figures 2A, 2B:
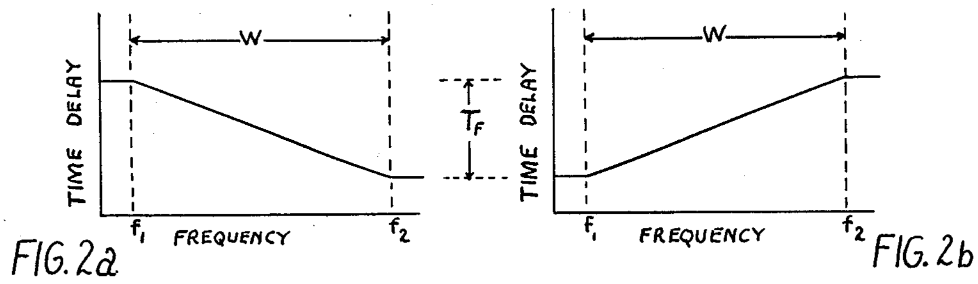

At receiver 20, filter 22 is another filter having a flat amplitude response over the bandwidth W of the signal but whose phase response is shown in FIGURE 2*b* to have an opposite sloping time-delay frequency function from filter 12. The time delay characteristic of filter 22 is made to be such that the two filters, 12 and 22, are complementary and the characteristics add up to produce a constant time delay over the bandwidth W. Since filter 22 acts to correct the delay distortion introduced by filter 12, the result is that the original non-overlapping train of pulses is approximately reconstituted in the output of filter 22.

Filters having the general characteristics of FIGURE 2 are disclosed in U.S. Patent No. 2,624,876 issued to Robert H. Dicke on January 6, 1953, wherein high pass filters in general are disclosed to have the characteristic of FIGURE 2*a* and low pass filters are stated to be like FIGURE 2*b*. U.S. Patent No. 2,678,997, issued to Sidney Darlington May 18, 1954, also discusses filter networks in which the amount of phase delay varies over a predetermined range of frequencies to provide a circuit in which the transmission time for an applied signal varies with frequency.

Figure 3:
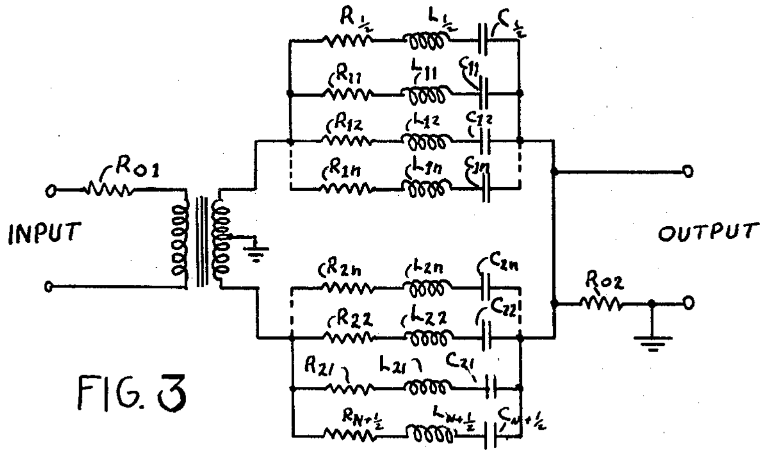
FIGURE 3 is a schematic diagram for a filter having the characteristics shown in FIGURE 2.

FIGURE 3 shows the circuit diagram of a band-pass filter network which has been found useful to produce the desired characteristic response. Here a plurality of series tuned circuits are shown. All the resistors $R_{11} \ldots R_{1n}, R_{21} \ldots R_{2n}$ have the same nominal value of resistance R; except for two instances which will be considered later. Resistances $R_{11} \ldots R_{1n}, R_{21} \ldots R_{2n}$ include the equivalent series resistance of the L–C of the branch at series resonance. Resistances $R_{01}$ and $R_{02}$ can be in whole or in part included in the input driving source and output load impedances respectively. The points labeled "input" and "output" may be interchanged without altering the filter characteristic.

The series L–C circuits are tuned to series resonance at frequencies $f_n$ across the nominal filter pass band in such a way as to tend to produce a delay in the filter transmission which varies linearly with frequency. In particular, if $T_A$ is the minimum delay, $T_B$ the maximum delay, and W is the bandwidth, then the number of resonators required per filter is approximately $(T_B-T_A)W$. If the minimum delay $T_A$ is at the lower band edge, $f_b$, then $$f_n-f_b=\frac{-WT_A}{T_B-T_A}+\sqrt{n\frac{W}{T_B-T_A}+\left(\frac{WT_A}{T_B-T_A}\right)^2}$$

If the minimum delay $T_A$ is at the higher band edge, $f_h$, then $$f_n=f_h+\frac{WT_A}{T_B-T_A}-\sqrt{n\frac{W}{T_B-T_A}+\left(\frac{WT_A}{T_B-T_A}\right)^2}$$

The above formulae in effect specify the LC product of the series L–C circuits. The individual $L_n$ or $C_n$ to be associated with a series resonance at $f_n$ are so chosen as to give to the filter substantially constant passband attenuation and delay slope. Let us define $\Delta f_n$ as equal to the magnitude of $f_{n+1}-f_n$ as given by the formulae above. Then the inductor $L_n$ should have an impedance equal to the sum of $R_{01}$ plus $R_{02}$ plus R at a frequency of $2\Delta f_n$. If $R_{01}$ and $R_{02}$ are nearly equal and large compared with R, the in-band transmission errors are substantially zero to within $(\Delta f_1)/2$ of the band edge.

If $f_1$ is the resonant frequency nearest the nominal lower frequency edge, $f_b$, of the pass-band W, $C_{11}$ is tuned to resonate with $L_{11}$ at that frequency; then $C_{21}$ is tuned to resonate with $L_{21}$ at $f_2$; $C_{12}$ resonates $L_{12}$ at $f_3$, and so on, alternating between the upper branch $Z_1$ and the lower branch $Z_2$ of the network until the entire pass-band W is obtained with the Nth resonating circuit in $Z_1$ or $Z_2$.

To this in-band structure, two out-of-band "corrector" resonators with inductances $L_{1/2}$ and $L_{N+1/2}$ are added, chosen to have impedances equal to $R_{01}$ plus $R_{02}$ at frequencies $\Delta f_1$ and $\Delta f_N$ respectively, and tuned to resonate at frequencies $f_{1/2}$ and $f_{N+1/2}$ by the above formulae, respectively. These resonators are placed respectively in the opposite branch of the transformer from the last associated in-band resonator. The exact location of the resonant frequency, value of inductance, and value of series resistor of the "corrector" resonators can be varied to affect somewhat the cutoff characteristic in the immediate vicinity of the band edge.

Other circuits, which are the equivalent of FIGURE 3, include the full lattice, of which FIGURE 3 is a half lattice, in which the branches of the network of FIGURE 3 are the bridge elements; and a network whose branches are series strings of parallel tuned circuits of which the capacitors play the role fulfilled above in the choice of the inductors, and which is tuned for parallel resonance in a manner analogous to that described above.

Figure 4:
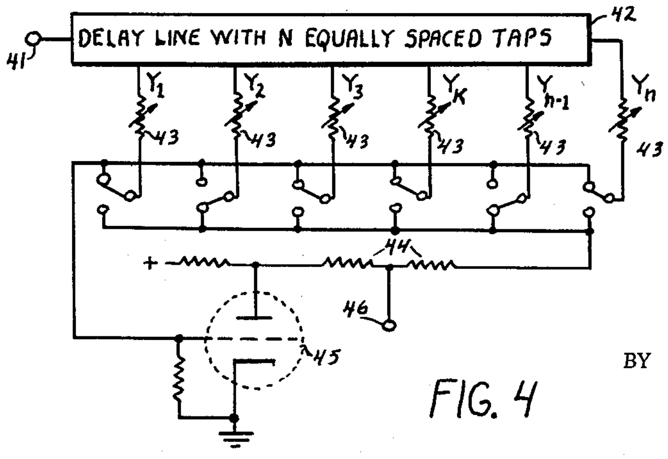
FIGURE 4 is a schematic diagram of tapped delay line filter for generating transient responses in the time domain.

In case the generation of the desired transient responses in the time domain is preferred, the well-known techniques using a tapped delay line is illustrated in FIGURE 4. H. E. Kallman in his paper "Transversal Filters," Proc. I.R.E., vol. 28, p. 302, July 1940, and M. Levy in J.A.I.E.E. part III, vol. 90, p. 153, December, 1943, disclosed broadly the use of multi-tapped delay lines to obtain a succession of voltages having the proper amplitude to synthesize by summation a close approximation to any waveform for which the Fourier series is known. Darlington's patent, referred to above, also discloses a tapped delay line used as a "pulse stretcher." More recent publications include C. R. Ammerman, "A New Approach to the Synthesis of Transversal Filters," Proceedings of National Electronics Conference, p. 829, vol. XI, 1955; Linden and Steinberg, "Synthesis of Delay Line Networks," I.R.E. Trans. on Aeronautical and Navigational Electronics, p. 34, March 1957, and Lerner, Reiffen and Sherman, "Delay Line Specifications for Matched-Filter Communications Systems," I.R.E. Trans. of Professional Group on Component Parts, vol. CP 6, No. 4, p. 263, December 1959, dealing at length with the use of the multitap delay line to serve as the "optimum" filter for the detection of pulsed signals in the presence of additive noise.

Briefly, an ideal delay line filter will be considered to be a structure as in FIGURE 4, having an input terminal 41, a delay line 42 having a number N of output taps $Y_1, Y_2, Y_3 \ldots Y_n$, spaced at equal intervals of delay equal to $\tau$ seconds. If a signal $x(t)$ is applied to input 41, the signals appearing at the taps differ from $x(t)$ only in their amplitude and time of occurrence. For example, at the $k$th tap:

$$y_k(t) = A_k x(t - \tau k)$$

In such an ideal delay line filter, the variable resistors 43, connected to each tap, provide a means for adjusting or weighting the individual tap output. A weighted sum is obtained from a summing network 44, which includes a resistance adding matrix and a difference amplifier to allow negative weights in the manner disclosed by Corrington and Sonnenfeldt. "Synthesis of Constant Time-Delay Networks," Proceedings of National Electronic Conference, vol. IX, pp. 50–63, 1953. Since actual delay lines possess limited bandwidth, the transient response of the delay line filter will tend to be smoothly varying instead of spikey.

The output at terminal 45 for an input $x(t)$ is then:

$$f(t) = \Sigma_1^N A_k x(t - k\tau)$$

Under these circumstances, any desired $f(t)$ which lasts less than $N_T$ seconds and which has a bandwidth of about $1/\tau$ c.p.s. can be closely approximated.

As is well known in the literature, cited above, the matched filter to the tap weightings of the ideal delay line is obtained by setting up the taps of a second delay line with the same weightings, but in reverse order.

Thus, if the characteristic of filter 12 is obtained by a given array of amplitude adjustments on the delay line taps, a matched filter characteristic is given filter 22 by setting up the same array of amplitude adjustments on the delay line taps but in the reverse order as for filter 12.

If the frequency characteristic of filter 12 is written as the product of a magnitude function and a phase function:

$$F_{12}(\omega) = |F_{12}(\omega)| \epsilon^{j\phi(\omega)}$$

then a matched filter characteristic $F_{22}(\omega)$ will differ from $F_{12}(\omega)$ in that it has the inverse (i.e., negative) phase characteristic:

$$F_{12}(\omega) F_{22}(\omega) = |F_{12}(\omega)|^2$$

Therefore the cascade of the two filters is $$F_{22}(\omega) = |F_{12}(\omega)| \epsilon^{-j\phi(\omega)}$$

It is the variation in the quantity $|F_{12}(\omega)|^2$ across the passband that produces the previously noted "hash level" and tendencies to intersymbol interference in the matched filter output. If the cascade of filters 12 and 22 has no amplitude variation as well as no phase distortion, then the "hash" is effectively eliminated. This can be done by the "mismatched" filter technique wherein the characteristic of filter 22 is designed to be close to the frequency domain inverse of filter 12. This is done by taking $$|F_{22}(\omega)| = \frac{1}{|F_{12}(\omega)|}$$

within the passband of the output waveform of filter 12. The inverse "mismatched" filter system effectively reduces the "hash level" below that inherent in the matched filter detection of an arbitrary signal.

Two important features of signalling on the presence of impulse noise are: first, the conversion of data pulse signals to signals whose waveforms bear little resemblance to the expected impulse noise waveforms and have a long duration compared with that of a given impulse disturbance; and the use of a clipping circuit preceding the signal recognition filter to counteract the integration of noise energy into a high level of hash at the output of the receiver.

Obviously, modifications and variations of the present invention are possible in the light of the above teachings. Consequently, it is understood that the foregoing description is to be taken as illustrative and not limiting the scope of the invention as defined in the claims.

I claim:

1. The method of transmitting information in the form of a coded sequence of pulse signals over a communication channel in the presence of additive impulse noise comprising the steps of performing a linear operation on each of said signals to convert said signals to a signal waveform having a long duration compared to said noise impulses, sending said signal waveforms to a receiver over said channel, applying all the waveforms received over said channel to a circuit which limits the amplitude of all received noise impulses to the usual maximum amplitude of said signal waveforms, and performing the inverse of said linear operation on said limited waveforms to recover said coded sequence of pulse signals and to convert said impulse noise energy to a waveform having a long time-energy distribution form unlike said information signals.

2. The method of transmitting information in the form of a coded train of elementary signals over a communication channel in the presence of additive impulse noise comprising the steps of performing a linear operation on each of said elementary signals to convert said elementary signals to signal waveforms having a bandwidth approximately equal to that of the channel and a duration long compared to the expected time interval between said noise impulses, sending said signal waveforms to a receiver over said channel, applying all the waveforms received over said channel to a circuit which limits the amplitude of all received noise impulses to the usual maximum amplitude of said received signal waveforms, and performing the inverse of said linear operation on said limited waveform to recover said coded train of elementary signals and to smear the impulse noise energy into a time-energy distribution substantially Gaussian in form.

3. The method of overcoming channel impulse noise interference in a data communication system comprising the steps of, applying elementary data signals to a first linear filter that introduces a different time delay to all frequencies over the bandwidth of the data signal so that different frequency components occur in the output of said first filter at different times so as to convert said data signals to a signal waveform having a predetermined time duration longer than said interference noise impulses, sending said signal waveforms over a channel subject to additive impulse noise to a remote receiver, applying the output of said channel at said receiver to a circuit which limits the amplitude of all received waveforms to the usual maximum value of said received signal waveforms, applying said amplitude limited waveforms to a second linear filter whose response restores the original time-phase relationship to all frequencies over the bandwidth of the data signal to recover data signals and to spread out the noise energy in time thereby destroying its impulse nature.

4. The method of overcoming channel impulse noise interference in a data communication system comprising the steps of, applying elementary data signals to a first linear filter whose response has a flat amplitude and a time delay increasing with frequency over the bandwidth of the elementary signal so that lower frequency components occur first followed by higher frequency components to convert said elementary signals to a signal waveform having a predetermined time duration longer than that of said interference noise impulses, sending said signal waveforms over a channel subject to additive impulse noise to a remote receiver, applying the output of said channel at said receiver to a circuit which limits the amplitude of all received waveforms to the usual maximum value of said received signal waveforms, applying said amplitude limited waveforms to a second linear filter whose response has a flat amplitude and a time delay decreasing with frequency over the bandwidth of the data elementary signal so that lower frequency signal components are delayed more than higher frequency signal components to recover elementary data signals and to convert impulse noise to a waveform having a long time-energy distribution.

5. The method of overcoming channel impulse noise interference in a pulse data communication system comprising the steps of, applying elementary data signals to a first linear filter whose response has a flat amplitude and a time delay increasing with frequency over the bandwidth of the channel so that lower frequency components occur first followed by higher frequency components to convert said data signals to a signal waveform having a predetermined time duration longer than the expected time interval between said interference noise impulses, sending said signal waveforms over a channel subject to additive impulse noise to a remote receiver, applying the output of said channel at said receiver to a circuit which limits the amplitude of all received waveforms to the usual maximum value of said received signal waveforms, applying said amplitude limited waveforms to a second linear filter whose response has a flat amplitude and a time delay decreasing with frequency over the bandwidth of the channel so that lower frequency signal components are delayed more than higher frequency signal components to recover data signals and to convert impulse noise to a waveform having a long time-energy distribution readily distinguished from data signals.

6. The method of transmitting information in the form of a coded sequence of pulses over a communication channel corrupted by additive impulse noise comprising, applying said coded sequence of pulses to a first linear filter whose impulse response is a waveform having a time duration long compared with the duration of individual noise impulses and a bandwidth equal to the bandwidth of the channel sending the output of said first filter to a remote receiver over said channel, applying the output of said channel to to a clip circuit at said receiver in order to limit the amplitude of all received noise impulses by clipping the peaks to a value just above the maximum expected amplitude of said received signal waveform, applying said clipped received waveform to a second linear filter whose impulse response is a waveform having a time duration and a bandwidth the same as said first filter and whose response to the waveform of said first filter is a pulse having a time duration the same as the pulses of said coded sequence, whereby the original coded sequence of pulses is recovered at the output of said second filter and the energy of said additive impulse noise is converted to a waveform having a long time-energy distribution.

7. The method of transmitting information in the form of a coded sequence of pulses over a communication channel corrupted by additive impulse noise comprising, applying said coded sequence of pulses to a first linear filter whose impulse response is a waveform having a time duration long compared with the duration of individual noise impulses and a bandwidth equal to the bandwidth of the channel to obtain a sequence of overlapping waveforms in which the signal pulse energy is delivered over a long time interval, sending the output of said first filter to a remote receiver over said channel, applying the output of said channel to a clip cricuit at said receiver in order to suppress impulse noise exceeding a predetermined value just above the maximum normally expected amplitude of said received signal waveform, applying said clipped received waveform to a second linear filter whose impulse response is a waveform having a time duration and a bandwidth the same as said first filter and whose response to the waveform of said first filter is a pulse having a time duration the same as the pulses of said coded sequence, whereby the original coded sequence of pulses is recovered at the output of said second filter and the energy of said additive impulse noise is spread out over the time interval between noise impulses.

8. The method of transmitting information in the form of a coded sequence of elementary signals over a communication channel corrupted by additive impulse noise comprising, applying said coded sequence of elementary signals to a first linear filter whose impulse response is a waveform having a time duration long compared with the duration of individual noise impulses and a bandwidth equal to the bandwidth of the channel sending the output of said first filter to a remote receiver over said channel, applying the output of said channel to a clip circuit at said receiver in order to limit the amplitude of all received noise impulses by clipping the peaks to a value just above the normally expected amplitude of said received signal waveform, applying said clipped received waveform to a second linear filter whose impulse response is a waveform having a time duration and a bandwidth the same as said first filter and whose response to the waveform of said first filter is an elementary signal having a time duration the same as the elementary signal of said coded sequence, whereby the original coded sequence of elementary signals is recovered at the output of said second filter and the energy of said additive impulse noise is converted to a waveform having a long time-energy distribution.

(References on following page)

References Cited by the Examiner

UNITED STATES PATENTS

| | | | |
|---|---|---|---|
| 2,412,994 | 12/1946 | Lehman | 325—324 |
| 2,695,359 | 11/1954 | Levy | 325—324 |
| 2,698,896 | 1/1955 | Rinia | 325—323 |
| 2,905,816 | 9/1959 | Buebel | 325—323 |

| | | | |
|---|---|---|---|
| 2,956,153 | 10/1960 | Farlow | 325—323 |
| 3,032,725 | 5/1962 | Knox-Seith | 333—20 |

HERMAN KARL SAALBACH, *Primary Examiner.*

NEIL C. READ, *Examiner.*

L. A. HOFFMAN, A. MORGANSTERN, *Assistant Examiners.*